United States Patent
Pu et al.

(10) Patent No.: US 9,963,761 B2
(45) Date of Patent: May 8, 2018

(54) METHOD AND APPARATUS FOR SECONDARY ENRICHMENT AND RECOVERY OF GERMANIUM FROM LOW-GRADE LIGNITE GERMANIUM CONCENTRATES WITH BY MICROWAVE HEATING IN VACUUM

(71) Applicants: Yunnan Lincang Xinyuan Germanium Industry Co., Ltd., Lincang (CN); Yunnan Dongchang Metal Tech Co., Ltd., Kunming (CN)

(72) Inventors: Shikun Pu, Kunming (CN); Wendong Bao, Kunming (CN); Decai Hu, Kunming (CN); Zhiguo Zhu, Kunming (CN); Tianmin Xie, Kunming (CN); Guangwen Li, Kunming (CN); Kaihong Bao, Kunming (CN); Caiwei Yao, Kunming (CN); Hanbao Liu, Kunming (CN); Wangchang Wu, Kunming (CN); Youwei Su, Kunming (CN)

(73) Assignees: Yunnan Lincang Xinyuan Germanium Industry Co., Ltd., Lincang (CN); Yunnan Dongchang Metal Tech Co., Ltd., Kunming (CN)

( * ) Notice: Subject to any disclaimer, the term of this patent is extended or adjusted under 35 U.S.C. 154(b) by 18 days.

(21) Appl. No.: 15/022,099

(22) PCT Filed: Jan. 19, 2015

(86) PCT No.: PCT/CN2015/070961
§ 371 (c)(1),
(2) Date: Mar. 15, 2016

(87) PCT Pub. No.: WO2016/086521
PCT Pub. Date: Jun. 9, 2016

(65) Prior Publication Data
US 2016/0298210 A1    Oct. 13, 2016

(30) Foreign Application Priority Data

Dec. 1, 2014 (CN) .......................... 2014 1 07111414
Dec. 1, 2014 (CN) .......................... 2014 2 07368433

(51) Int. Cl.
| | | |
|---|---|---|
| C22B 41/00 | (2006.01) | |
| C22B 1/00 | (2006.01) | |
| C01G 17/04 | (2006.01) | |
| C22B 3/10 | (2006.01) | |
| C22B 3/22 | (2006.01) | |
| C22B 4/02 | (2006.01) | |
| C22B 4/08 | (2006.01) | |
| H05B 6/80 | (2006.01) | |

(52) U.S. Cl.
CPC .............. *C22B 41/00* (2013.01); *C01G 17/04* (2013.01); *C22B 1/00* (2013.01); *C22B 3/10* (2013.01); *C22B 3/22* (2013.01); *C22B 4/02* (2013.01); *C22B 4/08* (2013.01); *H05B 6/80* (2013.01); *H05B 6/806* (2013.01); *Y02P 10/234* (2015.11)

(58) Field of Classification Search
CPC ............ B01J 19/126; B01J 2219/00141; B01J 2219/00162; C22B 41/00; C22B 3/22; C22B 4/02; C01G 17/04
USPC .... 423/96, 494; 75/364, 10.29, 10.64, 10.94
See application file for complete search history.

(56) References Cited

U.S. PATENT DOCUMENTS 4,643,110 A    2/1987    Lisowyj et al.

FOREIGN PATENT DOCUMENTS

| CN | 1101380 | 4/1995 |
|---|---|---|
| CN | 1814701 | 8/2006 |
| CN | 102121066 | 7/2011 |
| CN | 102337391 | 2/2012 |
| CN | 103361496 | 10/2013 |

OTHER PUBLICATIONS

Pu et al., "Improving Germanium distillation recovery rate from coal dust," Chinese Journal of Rare Metals, 2012, vol. 36, No. 5, pp. 817-820 (English language abstract provided).

*Primary Examiner* — Steven J Bos
(74) *Attorney, Agent, or Firm* — Hamre, Schumann, Mueller & Larson, P.C.

(57) ABSTRACT

Provided is a method and apparatus for secondary enrichment of germanium from low-grade lignite germanium concentrates in vacuum, and particularly a method and apparatus for secondary enrichment and recovery of germanium from low-grade lignite germanium concentrates with microwave heating in vacuum, which belongs to a germanium extraction method and apparatus in the field of metallurgy.

4 Claims, 4 Drawing Sheets

METHOD AND APPARATUS FOR SECONDARY ENRICHMENT AND RECOVERY OF GERMANIUM FROM LOW-GRADE LIGNITE GERMANIUM CONCENTRATES WITH BY MICROWAVE HEATING IN VACUUM

FIELD

Embodiments disclosed herein relate generally to germanium extraction methods in the field of metallurgical technologies. More specifically, the Embodiments disclosed herein relate to a method and apparatus for secondary enrichment and recovery of germanium from low-grade lignite germanium concentrates by microwave heating in vacuum.

BACKGROUND

China is a major manufacturing and trading country of germanium products in the world, with over than 70% of germanium products exported to developed countries such as the USA, Japan and Germany. Germanium concentrates are necessary intermediate materials for producing highly pure germanium, and mainly have the following two sources: a. a by-product when producing metals such as lead, zinc, copper and iron; major domestic highly pure germanium manufacturers using this source include more than 30 manufacturers, such as Chihong Zinc and Germanium Co. Ltd., Zhongjin Lingnan Shaoguan Smelting Plant, Yunnan Luoping Zinc and Electricity Co. Ltd., and Yunnan Dongcahng Metal Processing Co. Ltd.; b. a product directly extracted from lignite germanium ores using pyrometallurgy; major domestic highly pure germanium manufacturers using this source include about 10 manufacturers, such as Yunnan Lincang Xinyuan Germanium Co. Ltd., Tongli Germanium Co. Ltd. in Xilingol League of Inner Mongolian Autonomous Region, and Eastern Inner Mongolian Germanium Co. Ltd. Germanium concentrates, as an important raw material for producing germanium, are mostly sold to Yunnan Lincang Xinyuan Germanium Co. Ltd. for producing highly pure germanium dioxide, zone-refined germanium ingots, germanium monocrystal, germanium wafers, germanium monocrystal used for solar cells, organic germanium products and the like.

At present, usually chain furnaces are used to extract germanium concentrates from lignite germanium ores using pyrometallurgy. For example, the Chinese patent CN1101380 discloses a method of extracting germanium from lignite germanium ores, including a pyrometallurgy process and a hydrometallurgy process. The hydrometallurgy process includes a chlorination distillation procedure and a hydrolysis procedure. The pyrometallurgy process includes: sieving germanium-containing raw coal, preparing coal bars or coal balls, smelting the coal bars or coal balls in the chain furnace, and recycling the germanium-containing dust in the furnace with a cyclone dust collector, a bag-type dust collector and a foam dust collector. The obtained germanium concentrates go through the hydrometallurgy process again to extract germanium. Alternatively, a vortex furnace may be used. For example, the Chinese patent CN1101380 discloses a method of extracting germanium from lignite germanium ores using a vortex furnace. This method is mainly used by Tongli Germanium Co. Ltd. in Xilingol League of Inner Mongolian Autonomous Region. At the same time, a water vapor boiler is used for heat supply and power generation for cities. Alternatively, a chain-type dry distillation apparatus may be used. For example, the Chinese patent ZL200610010663.7 discloses a method of extracting germanium-containing substances from lignite germanium ores and making semicoke through dry distillation. In this method, a chain-type dry distillation apparatus is used to extract germanium-containing substances from lignite and make semicoke.

In addition, Pu Shikun et al. (*Chinese Journal of Rare Metals*, 2012, vol. 35, no. 5, page 817-820) proposes a method of recycling germanium through heating with alkali and distillation. The method aims to solve the problem that the recycling rate of germanium-containing coal dust is low when germanium is extracted by a conventional hydrochloric acid distillation process and lignite is processed using a pyrometallurgy process. This method comprises: adding sodium hydroxide, water and germanium-containing coal dust; stirring the mixture to be uniform; heating the mixture to be nearly boiled; stirring the mixture for sufficient reaction for 3-4 hours, so that germanium in the form of acid-insoluble tetrahedral $GeO_2$, GeO and GeS and the like in the germanium-containing coal dust can fully react with sodium hydroxide and can be converted into hydrochloric acid-solvable sodium germanate. At the same time, a saponification reaction occurs between sodium hydroxide and coal tar-packaged germanium, or coal tar-packaged germanium reacts with silicon dioxide to form sodium metasilicate, which will be dissolved in the solution, so that the packaged germanium is released and further reacts with sodium hydroxide to form sodium germinate. Then, evaporation is performed to remove excessive water content. And then industrial hydrochloric acid is added for neutralization. Thereafter, distillation is performed to separate $GeCl_4$. Using this method, the germanium recycling rate can be increased by 5.39%-33.18%.

After enrichment of lignite germanium ores using pyrometallurgy, usually the germanium content in the obtained bag dust must be greater than 1.0% before the dust is used as germanium concentrates and enters a chlorination leaching and distilling system for $GeCl_4$ extraction. If the germanium content in the obtained bag dust is less than 1.0%, usually, secondary enrichment by hydrometallurgical sulfuric acid or hydrochloric acid leaching-tannin or tannin extract germanium deposition needs to be performed to obtain germanium concentrates before chlorination and distilling processed are performed for $GeCl_4$ extraction. In recent years, with continued exploitation of germanium mines, quality germanium mines are decreasing and the germanium content in germanium ores is also decreasing. However, the germanium enrichment ratio of a pyrometallurgical enrichment furnace is fixed, so the germanium content in germanium concentrates obtained from pyrometallurgical enrichment processes is also decreasing. When the germanium content in germanium ores is less than 0.025%, the germanium content in most germanium concentrates obtained from pyrometallurgical enrichment processes is less than 1.0%. Therefore, when germanium concentrates with a germanium content less than 1.0% are directly treated with chlorination and distilling processes using hydrochloric acid, since the germanium content in the germanium concentrates is low and the content of impurities therein, such as silicon, aluminum, iron, calcium, magnesium etc., is high, when the germanium content in the germanium concentrates is reduced by half, the following problems will arise: a. the germanium recycling rate is only 90-92%; b. the cost is rather high, as the amount of accessories such as hydrochloric acid and lime will increase remarkably, and the expenses for labor and treatment devices will also increase remarkably; c. special enrichment and recycling devices are needed for distilling residue, so the germanium recycling cost for such germanium concentrates will be much higher; and d. a great amount of waste water cannot meet the emission standards, so water treatment devices should be added, causing great water treatment pressure and environment pressure. If low-grade germanium concentrates with a germanium content less than 1.0% are directly treated using the hydrometallurgical acid-alkali combined leaching-tannin extract germanium deposition process, the germanium recycling rate will be lower than 80%, and the direct cost for treating each kilogram of germanium will reach RMB 1,500-2,000 yuan.

If the grade of germanium concentrates can be increased from 1.0% to 30.0% or above, or rough $GeO_2$ concentrates with a grade of 60% or above can be obtained, and then chlorination and distillation processes are performed, the weight of germanium concentrates entering the chlorination process will decrease from 3,000 tons per year (assume the germanium grade is 1%, and an annual output of germanium concentrates is 30 tons) to 50-100 tons per year, and the production accessories for germanium extraction using the chlorination and distillation processes (such as HCl, lime, $MnO_2$, washing agents, industrial coal etc.), the energy consumption and the labor cost will be one $30^{th}$-$60^{th}$ of the original amount. For example, the annual consumption amount of HCl will decrease from 7,500 tons to 400-800 tons, and the annual consumption amount of lime will decrease from 1,500 tons to 100-200 tons. The cost of the above two items can be reduced by at least RMB 4 million yuan, and related labor cost, treatment cost for industrial waste water, waste gas and waste residue and the cost for related facilities and equipment will also decrease remarkably.

In the prior art, processes of leaching germanium from germanium concentrates using conventional hydrometallurgy are used, such as hydrochloric acid (oxidization) leaching, sulfuric acid (oxidization) leaching, sulfuric acid (flourination) leaching, direct sulfuric acid or hydrochloric acid leaching, leaching after roasting with sodium hydroxide or chloride, direct leaching using a sodium hydroxide solution, enrichment by direct roasting using pyrometallurgy, roasting with alkali, enrichment by chlorination and roasting. However, these methods have the following defects: a. the leaching rates using these methods can hardly exceed 85%; b. the recycling of germanium from the leachate is difficult; solvent extraction methods are used to recycle germanium from the leachate, but cheap and effective extraction solvents are difficult to find; c. the leaching and extracting processes are time-consuming and hard to control; and d. the harmless treatment cost of waste solution from the leaching and extracting process is quite high. In conclusion, it is difficult for these methods to solve the problems of recycling germanium from low-grade lignite germanium concentrate.

Figure 1:
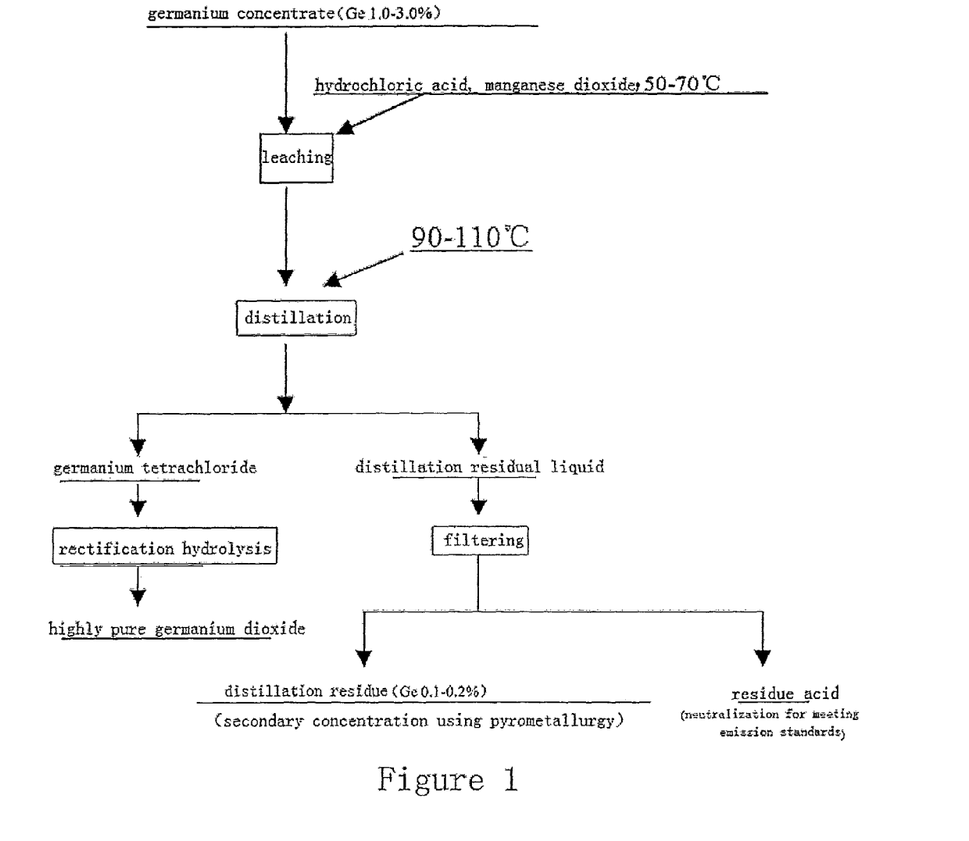
FIG. 1 is a flowchart showing a process for extracting germanium including $MnO_2$—HCl heating, leaching, distilling and separating.
Figure 2:
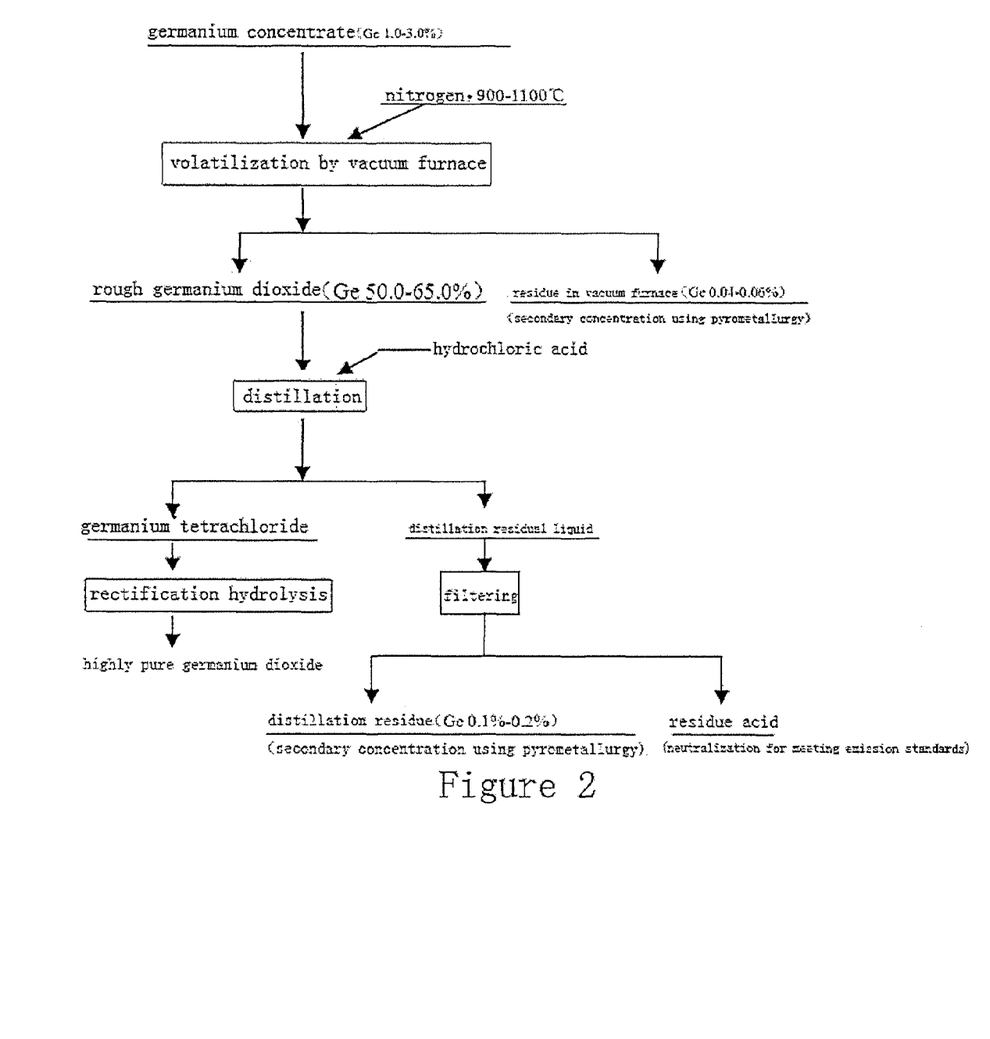
FIG. 2 is a flowchart showing a process for extracting germanium according to an embodiment.

In addition, germanium in germanium concentrates can be extracted using a $MnO_2$—HCl heating and leaching-distillation and separation method. The specific steps of the process are shown in FIG. 1. This process has the advantages of a simple and short workflow and simple operations. The disadvantage of this process is that for low-grade lignite germanium concentrates (Ge<3.0% and particularly Ge<1.5%), the consumption amount of HCl will dramatically increase, the residual acid after distillation has great influence to the environment and the waste water treatment cost is rather high.

SUMMARY

Technical Problem

Embodiments disclosed herein intends to solve the defects in the existing HCl heating and leaching-distillation and separation process for extracting germanium from low-grade lignite germanium concentrates, and provides a method and apparatus for secondary enrichment and recovery of germanium from low-grade lignite germanium concentrates with microwave heating in vacuum featured with high recycling efficiency, high enrichment times, low energy consumption, simple and convenient operations and less labor.

Technical Solution

The embodiments disclosed herein relate to a method for secondary enrichment and recovery of germanium from low-grade lignite germanium concentrates by microwave heating in vacuum, wherein the method extracts germanium using a process including: using an inert gas as a carrier for the low-grade lignite germanium concentrate; heating the low-grade lignite germanium concentrate with microwaves to a temperature of 900-1,100° C.; obtaining germanium concentrates with a germanium content of 30-50% after an enrichment process by volatilization using a vacuum furnace; heating with manganese dioxide $MnO_2$ and hydrochloric acid HCl and then leaching; and performing distillation and separation; and wherein a secondary enrichment process by volatilization in vacuum comprises the steps of:

Step 1: placing the low-grade lignite germanium concentrate in a vacuum volatilization furnace; placing a material crucible in a microwave heating device; and closing the furnace and connecting pipes of each part of the furnace;

Step 2: starting a vacuum device to reduce pressure in the vacuum volatilization furnace to be lower than 1,000 Pa;

Step 3: starting the microwave heating device to increase temperature to 900-1,100° C. at a rate of 20-50° C. per minute; opening a valve of the inert gas to supply the inert gas at an influx of 1-3 liters per minute; after reacting for 1-3 hours at a constant temperature, when germanium and other volatile substances volatize into smoke and into a dust collecting system, stopping heating; supplying the inert gas to the vacuum volatilization furnace; and cooling the vacuum volatilization furnace to a room temperature;

Step 4: after stopping vacuum, starting a settling and collecting chamber and a bag dust collecting chamber for collecting dust to obtain a germanium concentrate.

The method further comprises: adding an amount of 4-5 times the weight of the germanium concentrate of 10 mol/L industrial hydrochloric acid and an amount of the same weight of the germanium concentrate of water to the germanium concentrate to obtain a mixture; mixing the mixture uniformly; performing distillation and separation of the mixture to obtain $GeCl_4$; performing fine distillation and hydrolysis to the obtained $GeCl_4$ to obtain highly pure germanium dioxide.

The embodiments disclosed herein also relate to an apparatus for secondary enrichment and recovery of germanium from low-grade lignite germanium concentrates with microwave heating in vacuum, comprising: a microwave heating system, a setting and collecting system, a bag-type dust collecting system, an exhaust absorbing system, a vacuum system, an inert gas protecting system and a water cooling system, wherein the microwave heating system, the setting and collecting system and the bag-type dust collecting system are sequentially connected via pipes; exhaust from the bag-type dust collecting system is collected by the exhaust absorbing system; the inert gas protecting system is provided in the microwave heating system; vacuum pumping of the whole apparatus is performed by the vacuum carrying system; and cooling is performed by the water cooling system.

The method includes the steps of: placing the germanium concentrate in the vacuum volatilization furnace, starting a vacuum pump, pumping the air to reach an air pressure of less than 1,000 Pa, and starting the microwave heating device. Since the germanium concentrate includes about 8-12% carbon and about 10-15% ferric oxide, after microwave heating, the germanium concentrate absorbs the microwave and generates heat. Under a temperature of 900-1,100, the germanium in the germanium concentrate under a relatively low pressure and a high temperature volatizes in the form of germanium monoxide and germanium dioxide and enters the dust collecting system. After the large particles are set by the setting gas streams in the setting chamber, the fine particles with a high germanium content enter the bag-type dust collecting system along with the carrier gas. After filtering by the bags, a germanium enrichment product - - - rough germanium dioxide is obtained. The exhaust is discharged after absorption by a weak alkali solution. After the rough germanium dioxide is oxidized and leached by HCl and $MnO_2$, distillation and separation are performed to obtain rough $GeCl_4$.

Advantageous Effects

Compared with a process without volatilization under vacuum and microwave heating, the process of the present invention has the following advantages:

1) after secondary enrichment of the lignite germanium concentrate, the germanium content is increased from 0.5%-3.0% to 30%-50%, and the germanium enrichment ratio reaches 20-60 times;

2) after secondary enrichment of the lignite germanium concentrate, the weight of the germanium concentrate becomes one $20^{th}$ to $60^{th}$ of the original weight, and the consumption amounts of industrial hydrochloric acid and lime become one $20^{th}$ to $60^{th}$ of the original weights respectively;

3) the needs for distillation devices are also changed into one $20^{th}$ to $60^{th}$ of the volume;

4) the consumption amounts of vapor for distillation, industrial coal, $MnO_2$, and washing agents are greatly reduced, operation personnel is also substantially reduced, and the treatment capability is greatly improved;

5) since the germanium concentrate contains carbon and iron and absorbs microwaves, compared with a conventional electric heating method, microwave heating for secondary volatilization of germanium can save power consumption of about 30-40%;

6) using the volatile property of germanium monoxide (the volatilization temperature under the standard state is 710° C.) and germanium dioxide (the volatilization temperature under the standard state is 1,100° C.) and their volatile property in a vacuum state, when there is a carrier gas in a vacuum state, the volatilization temperatures of germanium monoxide and germanium dioxide decrease from 710° C. and 1,100° C. to 510° C.-550° C. and 800° C.-900° C., respectively; therefore, the power consumption for heating and volatilization is greatly saved;

7) in a vacuum state, the temperature increase time and the volatilization time are greatly reduced; the volatilization time can be reduced from 3 hours to 0.5 hour.

The present invention solves the following problems in the existing pyrometallurgy process for germanium extraction: the grade of germanium concentrates is reduced; the cost of the followed processes for germanium extraction such as chlorination substantially increases; and there is big pressure for harmless treatment of residual acid, residue, and exhaust gas. Since a traditional pyrometallurgical process for germanium extraction consumes a large amount of HCl and lime due to the low grade of germanium concentrates, requires higher production expenses, and waste acid and water pose great challenges to the environment, the present invention proposes a process including the steps of: performing secondary germanium volatilization and enrichment to the low-grade germanium concentrate using a vacuum furnace to obtain rough germanium dioxide; leaching the rough germanium dioxide with HCl; and performing distillation. As a result, the consumption amounts of HCl for distillation and lime for neutralization are greatly reduced.

BRIEF DESCRIPTION OF THE DRAWINGS

wherein: 1 refers to a microwave heating system; 2 a setting and collecting system; 3 a bag-type dust collecting system; 4 an exhaust absorbing system; 5 a vacuum system; 6 an inert gas protecting system; 7 a water cooling system; 1-1 a microwave generator; 1-2 microwave generator; 1-3 a material crucible; 1-4 a material supplying and discharging device; 2-1 a setting and collecting container; 5-1 a vacuum valve; 5-2 a mechanical pump; and 7-1 a water-cooled vacuum-sealed flange.

DETAILED DESCRIPTION

The embodiments disclosed herein relate to a method for secondary enrichment and recovery of germanium from low-grade lignite germanium concentrates by microwave heating in vacuum.

Embodiment 1

A method for secondary enrichment and recovery of germanium from low-grade lignite germanium concentrates by microwave heating in vacuum includes the following steps. The germanium concentrate shown in Table 1 is used as the raw material.

TABLE 1

| Main Chemical Composition of Germanium Concentrates | | | | | | | | |
|---|---|---|---|---|---|---|---|---|
| Composition | | | | | | | | Loss on |
| Ge | $SiO_2$ | $Fe_2O_3$ | $Al_2O_3$ | As | CaO | MgO | S | Ignition |
| Content % 0.5-3.0 | 60-70 | 4-10 | 10-15 | 0.1-0.3 | 2-5 | 1-2 | 1-2.0 | 12.10 |

Step 1: Weigh 1,000 g of germanium concentrates with a germanium content of 1.01%, and put the same into a high alumina crucible having a capacity of 2.5 L; put the material crucible in a furnace chamber of the microwave heating device; close the furnace body and the connecting pipes of each part; and check the air-tightness.

Step 2: After checking, while ensuring the sealing, turn off the gas intake valve of the furnace top; start a vacuum pump to pump air until the pressure of the system is lower than 1,000 Pa.

Step 3: After the pressure of the system is lower than 1,000 Pa, start the microwave heating device to increase the temperature to 900° C. at a rate of 20° C. per minute; open the valve of the nitrogen protective gas; introduce a nitrogen gas flow at a rate of 1 liter per minute; stop heating after the reaction continues for 3 hours at a constant temperature; introduce a nitrogen gas flow again to cool the furnace to the room temperature.

Step 4: After stopping the vacuum state, open the furnace cover; take out the material crucible; take out and weigh the residue, and obtain 872 g of the residue; after analysis, calculate the germanium content in the residue as 0.041%, the residual rate of germanium as 3.54%, and the volatilization rate of the secondary residue as 96.46%.

Step 5: Start the setting and collecting chamber and the bag-type dust collecting chamber to collect the set volatiles; combine the obtained volatiles, weigh the same and obtain 27.62 g of the residue; calculate the germanium content in the volatiles as 35.03% and the germanium recovery rate as 95.79%.

Step 6: Add industrial hydrochloric acid of 10 mol/L and of 4 times of the weight of the obtained germanium concentrates, i.e., 110.48 g, and add water of the same weight of the obtained germanium concentrates, i.e., 27.62 g to the high germanium content germanium concentrates obtained according to the above process; mix the mixture uniformly; and perform distillation and separation to obtain $GeCl_4$.

Figure 3:
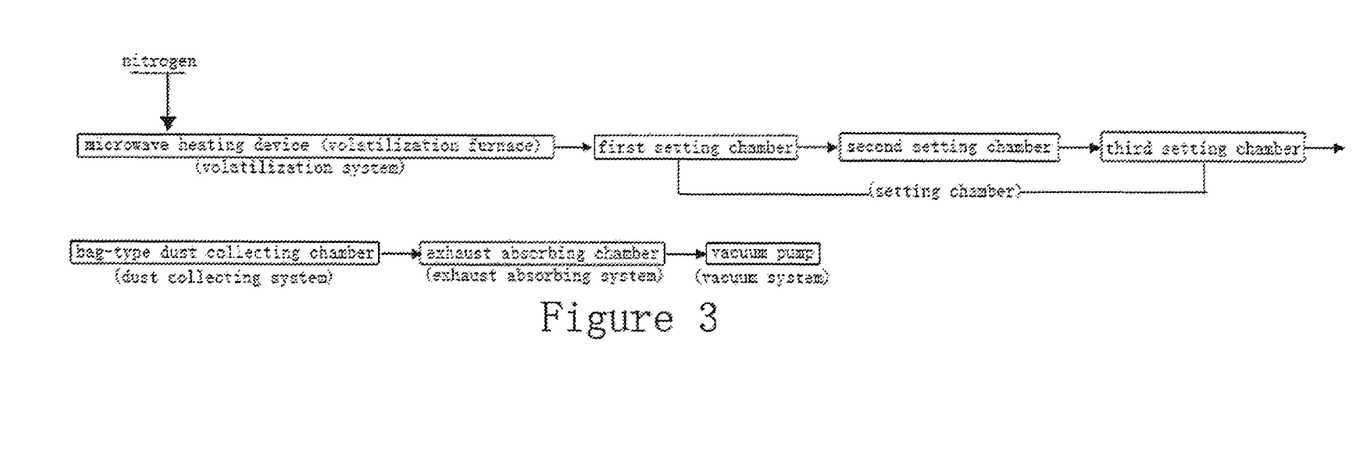
FIG. 3 is a schematic connection view of the apparatus according to an embodiment.
Figure 4:
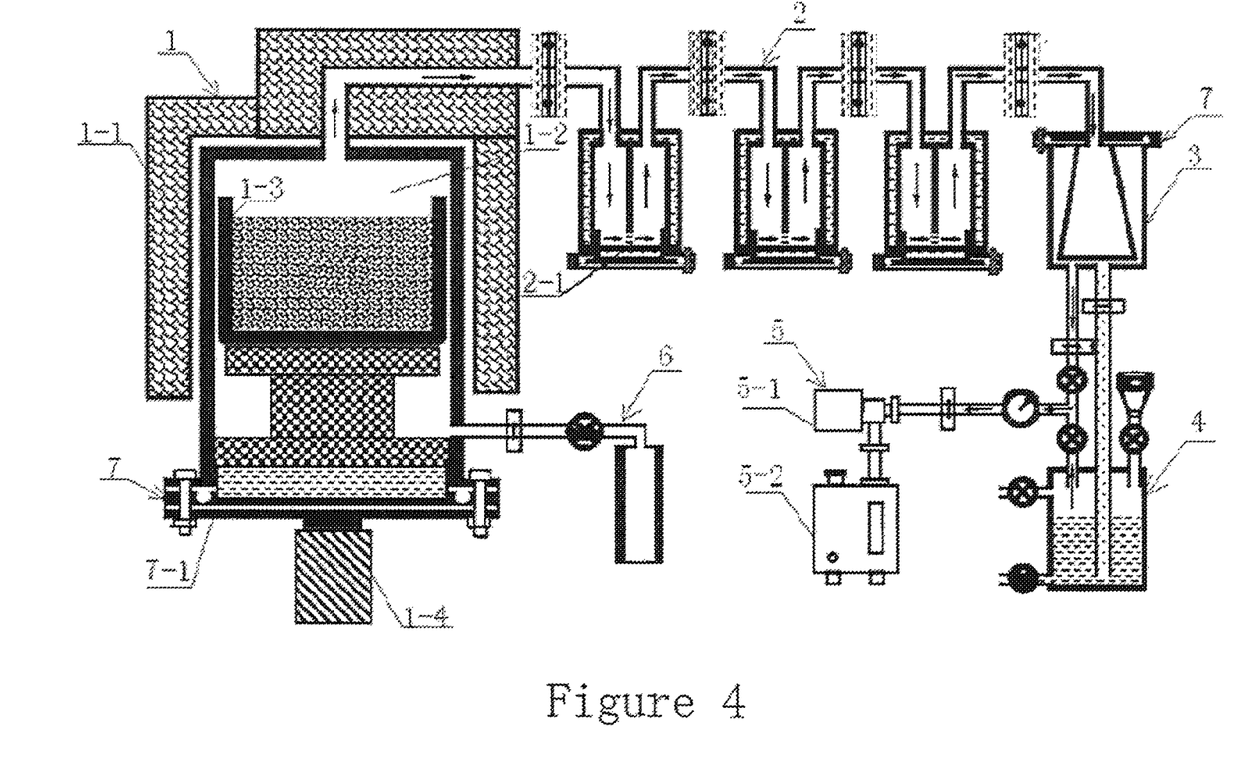
FIG. 4 is a schematic structural view of the apparatus according to an embodiment.

The germanium concentrate vacuum enrichment apparatus used in this process comprises: a microwave heating system 1, a setting and collecting system 2, a bag-type dust collecting system 3, an exhaust absorbing system 4, a vacuum system 5, an inert gas protecting system 6 and a water cooling system 7.

The microwave heating system 1 comprises: a microwave generator 1-1, a heating chamber 1-2, a material crucible 1-3, a material supplying and discharging device 1-4, a water-cooled vacuum-sealed flange 7-1 and the inert gas protecting system 6. The materials are placed in the material crucible 1-3 which is placed in the heating chamber 1-2; the microwave generator 1-1 encloses the whole heating chamber 1-2; the inert gas protecting system 6 communicates with the heating chamber 1-2; the water-cooled vacuum-sealed flange 7-1 is provided between the heating chamber 1-2 and the microwave generator 1-1.

The heating chamber 1-2 is connected to the setting and collecting system 2 via a pipe on which the water-cooled vacuum-sealed flange 7-1 is provided; a setting and collecting chamber is configured to set large particles in a gas stream, which enters a setting and collecting container 2-1; fine particles with a high germanium content enters the bag-type dust collecting system 3 along with a carrier gas.

After filtering by the bag-type dust collecting system 3, a germanium enrichment product - - - rough germanium oxide is collected; the exhaust is absorbed by a weak alkali solution in the exhaust absorbing system 4 and then discharged; the bag-type dust collecting system 3 is also provided with the water-cooled vacuum-sealed flange 7-1 for cooling the same.

The vacuum system 5 is provided at a tail end of the apparatus; and the whole apparatus is in a vacuum state by a vacuum valve 5-1 and a mechanical pump 5-2 working together.

Compared with volatilization under a normal pressure, volatilization under a vacuum state in the embodiment has better volatilization effects, which is listed in Table 2 as below:

TABLE 2

| No. | Sample Weight (g) | Germanium Content (%) | Volatilization Temperature (° C.) | Volatilization Manner | Volatilization Time (hour(s)) | Residue after Volatilization (g) | Germanium Content after Volatilization (%) | Germanium Volatilization Rate (%) |
|---|---|---|---|---|---|---|---|---|
| 1 | 10.0 | 1.00 | 900 | Volatilization under a normal pressure | 3 | 9.09 | 1.09 | 0.92 |
| 2 | 10.0 | 1.00 | 900 | Volatilization under a normal pressure | 3 | 9.03 | 1.1 | 0.67 |
| 3 | 10.0 | 1.00 | 1,000 | Volatilization under a normal pressure | 3 | 8.97 | 0.82 | 26.45 |

TABLE 2-continued

| No. | Sample Weight (g) | Germanium Content (%) | Volatilization Temperature (° C.) | Volatilization Manner | Volatilization Time (hour(s)) | Residue after Volatilization (g) | Germanium Content after Volatilization (%) | Germanium Volatilization Rate (%) |
|---|---|---|---|---|---|---|---|---|
| 4 | 10.0 | 1.00 | 1,000 | Volatilization under a normal pressure | 3 | 8.0 | 0.83 | 33.60 |
| 5 | 10.0 | 1.00 | 1,050 | Volatilization under a normal pressure | 3 | 8.89 | 0.53 | 52.88 |
| 6 | 10.0 | 1.00 | 1,050 | Volatilization under a normal pressure | 3 | 8.86 | 0.53 | 53.04 |
| 7 | 10.0 | 1.00 | 1,200 | Volatilization under a normal pressure | 3 | 8.96 | 0.2 | 82.08 |
| 8 | 10.0 | 1.00 | 1,200 | Volatilization under a normal pressure | 3 | 8.93 | 0.2 | 82.14 |
| 1 | 2.0 | 1.00 | 900 | Volatilization under a vacuum state | 0.5 | 1.54 | 0.15 | 88.45 |
| 2 | 3.6 | 1.00 | 1,100 | Volatilization under a vacuum state | 0.5 | 2.15 | 0.041 | 97.55 |

Table 2 shows that:
1) only when the volatilization temperature reaches 1,200° C. under the normal temperature and normal pressure, can a volatilization rate of 82% or more be reached, whereas in a vacuum state and at a temperature of 900° C., a volatilization rate of 88% or more can be reached, so the volatilization temperature is reduced by at least 300° C. compared with the first case;
2) the volatilization speed is fast under the vacuum state, and the volatilization time is reduced from 3 hours to 0.5 hour.

Embodiment 2

Another method for secondary enrichment and recovery of germanium from low-grade lignite germanium concentrates by microwave heating in vacuum includes the following steps. The germanium concentrate shown in Table 1 is used as the raw material.

TABLE 1

Main Chemical Composition of Germanium Concentrates

| | Composition | | | | | | | Loss on |
|---|---|---|---|---|---|---|---|---|
| | Ge | SiO$_2$ | Fe$_2$O$_3$ | Al$_2$O$_3$ | As | CaO | MgO | S | Ignition |
| Content, % | 0.5-3.0 | 60-70 | 4-10 | 10-15 | 0.1-0.3 | 2-5 | 1-2 | 1-2.0 | 12.10 |

Step 1: Weigh 1,000 g of germanium concentrates with a germanium content of 1.01%, and put the same into a high alumina crucible having a capacity of 2.5 L; put the material crucible in a furnace chamber of the microwave heating device; close the furnace body and the connecting pipes of each part; and check the air-tightness.

Step 2: After checking, while ensuring the sealing, turn off the gas intake valve of the furnace top; start a vacuum pump to pump air until the pressure of the system is lower than 1,000 Pa.

Step 3: After the pressure of the system is lower than 1,000 Pa, start the microwave heating device to increase the temperature to 1,000° C. at a rate of 50° C. per minute; open the valve of the nitrogen protective gas; introduce a nitrogen gas flow at a rate of 3 liters per minute; stop heating after the reaction continues for 2 hours at a constant temperature; introduce a nitrogen gas flow again to cool the furnace to the room temperature.

Step 4: After stopping the vacuum state, open the furnace cover; take out the material crucible; take out and weigh the residue, and obtain 895 g of the residue; after analysis, calculate the germanium content in the residue as 0.027%, the residual rate of germanium as 4.24%, and the volatilization rate of the secondary residue as 95.76%.

Step 5: Start the setting and collecting chamber and the bag-type dust collecting chamber to collect the set volatiles; combine the obtained volatiles, weigh the same and obtain 21.37 g of the residue; calculate the germanium content in the volatiles as 25.34% and the germanium recovery rate as 95.01%.

Step 6: Add industrial hydrochloric acid of 10 mol/L and of 5 times of the weight of the obtained germanium concentrates, i.e., 106.85 g, and add water of the same weight of the obtained germanium concentrates, i.e., 21.37 g to the high germanium content germanium concentrates obtained according to the above process; mix the mixture uniformly; and perform distillation and separation to obtain $GeCl_4$.

Embodiment 3

A still another method for secondary enrichment and recovery of germanium from low-grade lignite germanium concentrates with microwave heating in vacuum includes the following steps. The germanium concentrate shown in Table 1 is used as the raw material.

TABLE 1

Main Chemical Composition of Germanium Concentrates

| | Composition | | | | | | | Loss on |
|---|---|---|---|---|---|---|---|---|
| Ge | $SiO_2$ | $Fe_2O_3$ | $Al_2O_3$ | As | CaO | MgO | S | Ignition |
| Content, % 0.5-3.0 | 60-70 | 4-10 | 10-15 | 0.1-0.3 | 2-5 | 1-2 | 1-2.0 | 12.10 |

Step 1: Weigh 1,000 g of germanium concentrates with a germanium content of 2.36%, and put the same into a high alumina crucible having a capacity of 2.5 L; put the material crucible in a furnace chamber of the microwave heating device; close the furnace body and the connecting pipes of each part; and check the air-tightness.

Step 2: After checking, while ensuring the sealing, turn off the gas intake valve of the furnace top; start a vacuum pump to pump air until the pressure of the system is lower than 1,000 Pa.

Step 3: After the pressure of the system is lower than 1,000 Pa, start the microwave heating device to increase the temperature to 1,100° C. at a rate of 30° C. per minute; open the valve of the nitrogen protective gas; introduce a nitrogen gas flow at a rate of 2 liters per minute; stop heating after the reaction continues for 1 hour at a constant temperature; introduce a nitrogen gas flow again to cool the furnace to the room temperature.

Step 4: After stopping the vacuum state, open the furnace cover; take out the material crucible; take out and weigh the residue, and obtain 899 g of the residue; after analysis, calculate the germanium content in the residue as 0.049%, the residual rate of germanium as 1.87%, and the volatilization rate of the secondary residue as 98.13%.

Step 5: Start the setting and collecting chamber and the bag-type dust collecting chamber to collect the set volatiles; combine the obtained volatiles, weigh the same and obtain 45.63 g of the residue; calculate the germanium content in the volatiles as 50.93% and the germanium recovery rate as 98.47%.

Step 6: Add industrial hydrochloric acid of 10 mol/L and of 4 times of the weight of the obtained germanium concentrates, i.e., 182.52 g, and add water of the same weight of the obtained germanium concentrates, i.e., 45.63 g to the high germanium content germanium concentrates obtained according to the above process; mix the mixture uniformly; and perform distillation and separation to obtain $GeCl_4$.

We claim:

1. A method for secondary enrichment and recovery of germanium from a low-grade lignite germanium concentrate with microwave heating in vacuum, comprising:

transferring a low-grade lignite germanium concentrate into a material crucible and placing the material crucible containing the low-grade lignite germanium concentrate in a heating chamber of a microwave heating device for vacuum volatilization; and closing the heating chamber and connecting pipes of each part of the heating chamber;

starting a vacuum device to reduce pressure in the heating chamber to be lower than 1,000 Pa;

starting the microwave heating device to increase temperature to 900-1,100° C. at a rate of 20-50° C. per minute; opening a valve of an inert gas to supply the inert gas at an influx of 1-3 liters per minute; after reacting for 1-3 hours at a constant temperature, when germanium and other volatile substances volatize into smoke and into a dust collecting system, stopping heating; supplying the inert gas to the heating chamber to cool the heating chamber to room temperature; and after stopping vacuum, starting a settling and collecting chamber and a bag dust collecting chamber for collecting dust; combining the dust to obtain a germanium concentrate.

2. The method according to claim 1, further comprising:

adding to the germanium concentrate 10 mol/L hydrochloric acid at an amount of 4-5 times the weight of the germanium concentrate and water at an amount of the same weight of the germanium concentrate to obtain a mixture;

mixing the mixture uniformly; and performing distillation and separation of the mixture to obtain $GeCl_4$.

3. An apparatus for secondary enrichment and recovery of germanium from a low-grade lignite germanium concentrate with microwave heating in vacuum, comprising: a microwave heating system; a settling and collecting system; a bag dust collecting system; an exhaust absorbing system; a vacuum system; an inert gas protecting system; and a water cooling system, wherein the microwave heating system, the settling and collecting system, and the bag dust collecting system are sequentially connected via pipes;

an exhaust from the bag dust collecting system is processed by the exhaust absorbing system;

the inert gas protecting system is in fluid connection with the microwave heating system;

vacuum pumping of the apparatus is performed by the vacuum system; and cooling is performed by the water cooling system.

4. The apparatus according to claim 3, wherein the microwave heating system comprises: a microwave generator; a heating chamber; a material crucible; and a material supplying and discharging device, wherein the low-grade lignite germanium concentrate is placed in the material crucible in the heating chamber; the microwave generator encloses the heating chamber;

the inert gas protecting system is in fluid connection with the heating chamber;

a water-cooled vacuum-sealed flange of the water cooling system is provided between the heating chamber and the microwave generator;

the heating chamber is in fluid connection with the settling and collecting system via a pipe on which another water-cooled vacuum-sealed flange of the water cooling system is provided;

the settling and collecting system has a settling and collecting chamber that is configured to settle large particles in a gas stream entering a settling and collecting container;

fine particles having a high germanium content carried by the gas stream enter the bag dust collecting system;

the bag dust collecting system filters the fine particles having a high germanium content carried by the gas stream to collect a germanium enriched product that is rough germanium oxide and discharges an exhaust;

the exhaust enters the exhaust absorbing system, the exhaust is absorbed by a weak alkali solution in the exhaust absorbing system and then discharged;

a water-cooled vacuum-sealed flange is provided to cool the gas stream entering the settling and collecting container; and the vacuum system is provided at an end of the apparatus; and the vacuum system has a vacuum valve and a mechanical pump.

* * * * *